Figure 1:
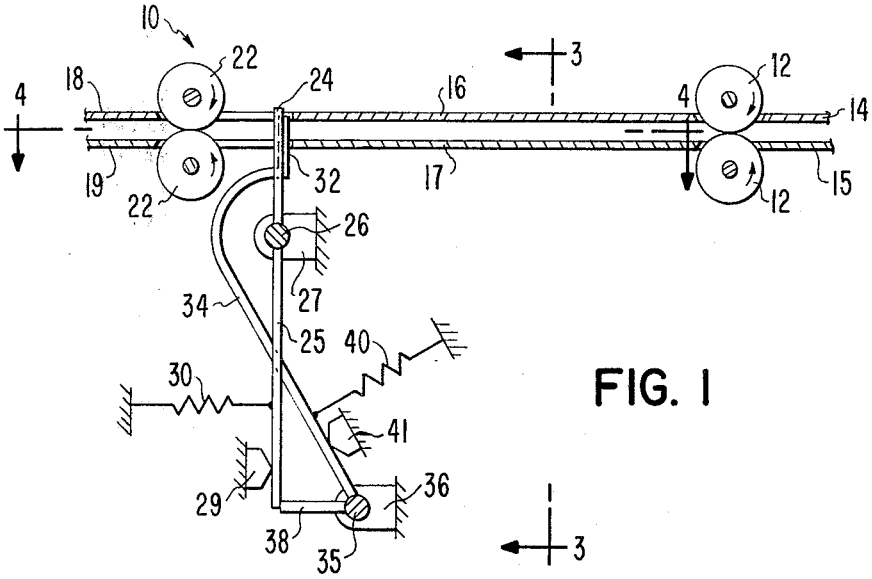
Figure 2:
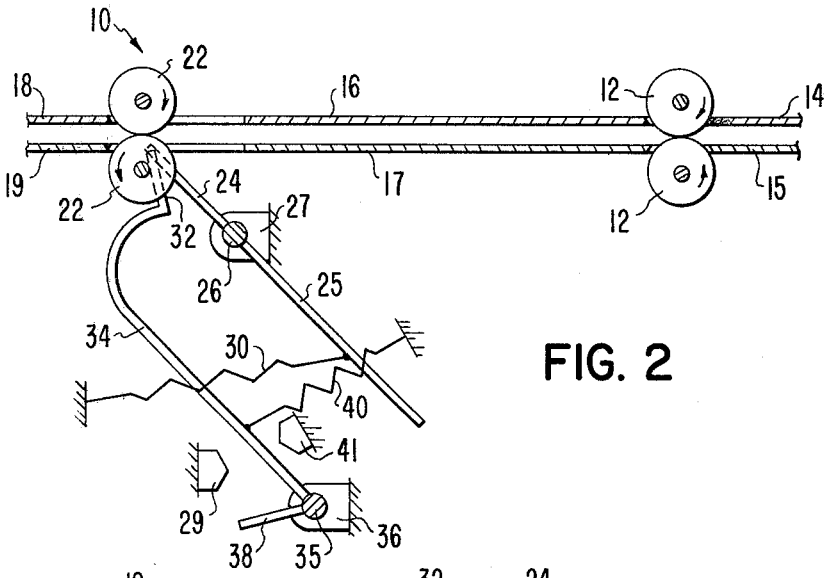
Figure 3:
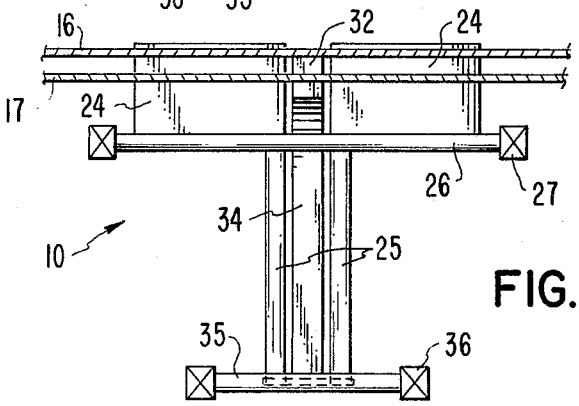
Figure 4:
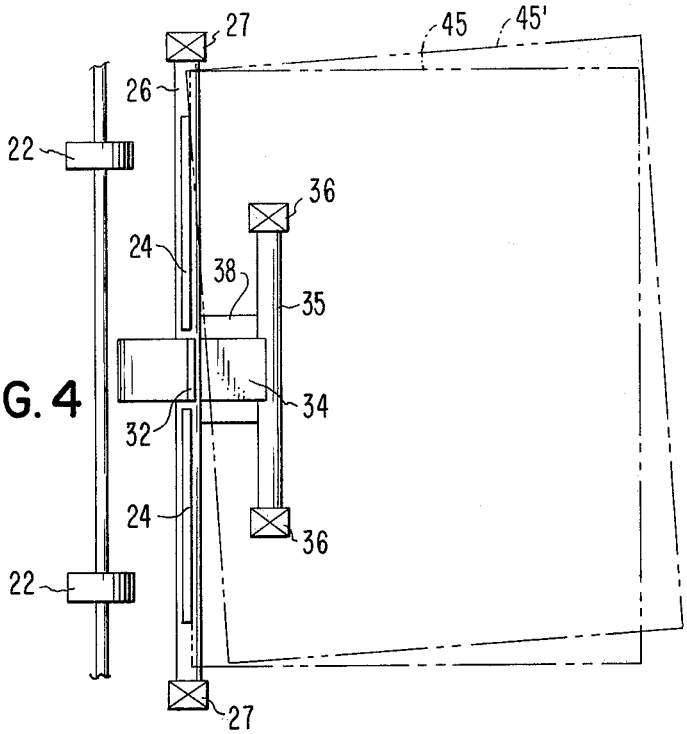
Figure 5:
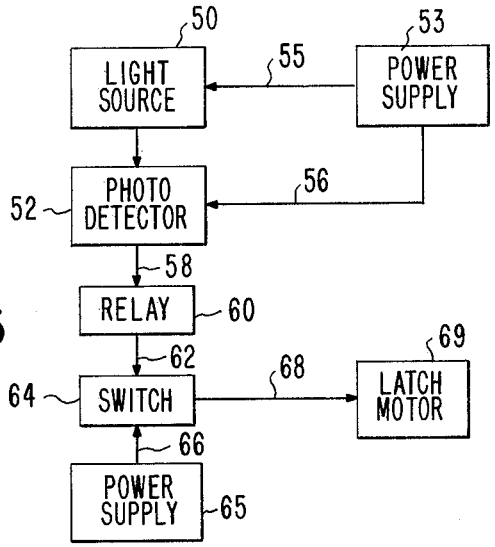

United States Defensive Publication [19] (H) [11] T102,003

Bullock [43] Jul. 6, 1982

[54] METHOD AND APPARATUS FOR ALIGNING PLIABLE MATERIAL

[76] Inventor: Michael K. Bullock, 1487 Kennedy Ct., Boulder, Colo. 80303

[21] Appl. No.: 248,130

[22] Filed: Mar. 26, 1981

Related U.S. Application Data

[63] Continuation of Ser. No. 42,741, May 29, 1979, abandoned.

[51] Int. Cl.[3] ..... B65H 7/02

[52] U.S. Cl. ..... 271/227; 271/244; 271/245

[57] ABSTRACT

The method and apparatus aligns the leading edge of pliable sheet material such as paper, transverse to its intended direction of travel. Feed means positively advances the material between guide members towards an alignment member pivotally mounted but releasably secured by a latch means in the plane of the desired leading edge orientation for the sheet material. Position sensing means adjacent the alignment member senses proper leading edge orientation. The latch means responds to the position sensing means operation to release the alignment member and sheet material for movement towards transport means adapted to positively engage the sheet material leading edge to convey the properly orientated sheet material.

In a typical configuration, the feed means is a set of feed rollers, the alignment member is a pivotally mounted mechanical gate assembly, and the leading edge alignment sensing means is a mechanical trigger member or photoelectric sensing means. Upon proper alignment, the latch means releases permitting the alignment member to rotate and deliver the leading edge of the aligned sheet material to transport means downstream from the alignment gate assembly. When the transport means is a roller set, its nip positively engages the sheet material and thus maintains secure alignment as it drives the sheet material further along the intended paper path.

16 Claims, 2 Sheets Drawing,

20 Pages Specification

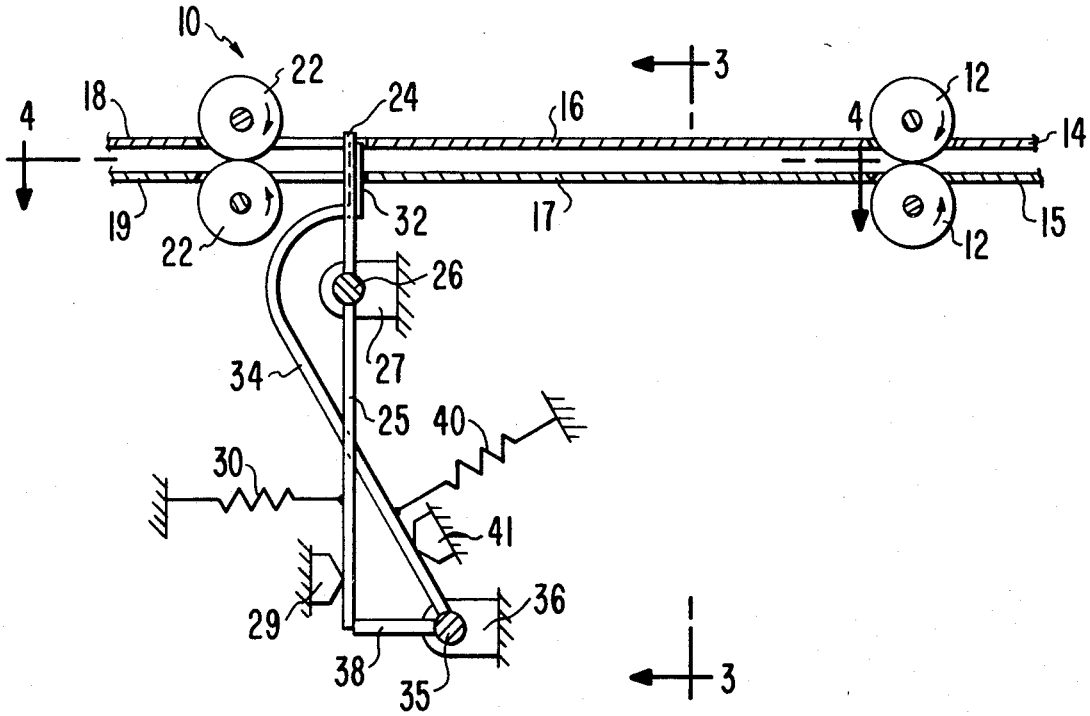

The file of this unexamined application may be inspected and copies thereof may be purchased (849 O.G. 1221, Apr. 9, 1968).